UNITED STATES PATENT OFFICE.

EDUARD POHL, OF HONNEF, GERMANY.

PROCESS OF PREPARING MINERAL FERTILIZERS.

952,278.  Specification of Letters Patent.  Patented Mar. 15, 1910.

No Drawing.  Application filed August 28, 1907. Serial No. 390,478.

*To all whom it may concern:*

Be it known that I, EDUARD POHL, engineer, subject of the German Empire, residing at Honnef-on-the-Rhine, German Empire, have invented certain new and useful Improvements in Processes of Preparing Mineral Fertilizers, of which the following is a specification.

This invention relates to a process of making artificial manure or preparing mineral fertilizers from alumina and silicic acid, or from natural and artificial materials containing alumina, silicic acid and potassium.

The primary object of the invention is to utilize the large quantities of alumina and silicic acid, or materials containing alumina, silicic acid and potassium which exist in nature, as well as ash containing silicic acid and alumina and particularly resulting from burned brown coal, and also house refuse containing such ash and like minerals in expeditiously and economically preparing an artificial manure or mineral fertilizer suitable for agricultural purposes.

As an example of the raw materials adapted for carrying out the present process the following may be used: known minerals which are rich in potassium, such as potassium-feldspar with 10-16% potassium, mica with 8-10% phonolite, trachyte with 7-8% granite, syenite and gneiss with 5-6% potassium, or their products resulting from decomposition and which occur in nature in large quantities, as clay, loam, potters' clay, marl, ooze, etc., or any suitable waste materials containing alumina and silicic acid, such as brown coal ash, house-rubbish, etc. All these and similar materials are treated in accordance with the present process by mixing them, finely triturated, preferably with quick lime in a cold or hot state, and subjecting the mixture which may be dampened to the action of steam in open receptacles at atmospheric pressure or in closed receptacles under high pressure until chemical conversion has been effected, and then drying the mass and converting it into a finely divided condition so that it can be conveniently scattered.

In the use of the manure or manure fertilizer made in accordance with the features of the invention, it is proposed to scatter the same as artificial manure on land, or for the purpose of absorption it may be thrown in outhouses or on manure heaps. According to the composition of the material in each case, it may be found necessary or advisable to add to the mixture of the materials with quick-lime or to the finished products, suitable chemicals, such as potassium, phosphorus, ammonia compounds, etc., which latter increase the manuring value of the finished product. These latter chemicals may be added to the natural or artificial materials prior to the mixture therewith of quick lime and treatment by steam, or any one of such chemicals may form a constituent which is mixed with the finished product. Since the finished product becomes sterile on account of the treatment with steam, it can be inoculated with suitable bacteria known as being adapted for fertilizing purposes, and the resultant material obtained by this latter treatment can then be used as manure.

The present invention is of advantage in the utilization of potassium which is present in many minerals in large quantities and a potassium manure is not only produced in a simple and economical manner, but the remaining constituents of the minerals are converted into aqueous double silicates which render arable land capable of "absorption" or of absorbing and changing vegetable nutrients. The process as hereinbefore noted is also advantageous in making use of house rubbish, such as the residuum or ash of burned brown coal used in some localities and which has hitherto been difficult to treat to render it usable for any practicable purpose. In accordance with the present invention it would only be necessary to separate the house refuse into its finer and coarser constituents, mix the finer constituents with quick-lime, and treat them with steam in order to make a usable product from the refuse. If clay, kaolin, loam, potters' clay, marl, etc. be individually used as the primal basis, it is necessary to kiln-dry these products or materials for the purpose of removing the water from them before mixing the same with quick-lime. These materials are, generally speaking, heated, say from 200° to 300° C. to eliminate the moisture.

The quantity of quicklime which is to be added to the raw materials depends upon the chemical composition of the material. For example, materials such as phonolite and other substances which contain considerable quantities of lime and are for the most part soluble in hydrochloric acid, require only a small addition of quick-lime;

whereas, feldspar, which contains no lime at all, must have a larger quantity of quick-lime added to it. The minimum and maximum limits of addition of lime are found to be about 10-45%.

The temperature at which the chemical conversion between quick-lime and the raw or basic material takes place cannot be exactly fixed. With many clays a temperature of 120° suffices; whereas, the residuum or ash of brown coal and volcanic ash only requires to be heated to about 80° in order to produce the desired hydrosilicate of lime-aluminate. In the use of feldspar a temperature of about 160°-180° C. must be employed. The conversion of brown coal ash takes place when employing steam at a pressure below that of the atmosphere and in a very short time; whereas, other materials which are difficult to convert, such as feldspar, require a pressure of 6, 8 to 10 atmospheres above atmospheric pressure, and the action of the steam must continue for several hours.

In carrying out the process the known methods of and devices for slaking, mixing, storing and pressing used in the manufacture of calcareous sandstones are employed with advantage. These known and approved means with their manifold modes of slaking and mixing lime, storing the mixture in silos, and the different methods of hardening the pressed materials can be employed with great advantage for the purposes of the present process. The products obtained are converted into zeolithic hydrosilicates, and when applied render land on which they are scattered capable of absorption so that the constituents can be easily assimilated by the plants; and, as hereinbefore noted, in the event that the finished product becomes sterile it may be inoculated with suitable bacteria which are advantageous in vegetable nutriment and thereby obtain bacilli-culture. Bacteria that may be used are as follows: *Clostridium pasteurianum* Winogradsky, *Bacillus radiciola*, and *Azotobakter chroococcum* Beijerinck.

The present process is especially important for potash manuring, as the disadvantages frequently incident to manuring with alkaline chlorids are avoided. The artificial or mineral manure produced in accordance with the present process is useful on any kind of land and will greatly enrich land that has remained unproductive for a long time and render such unproductive land arable.

What is claimed is:

1. The process of preparing mineral fertilizer from materials containing alumina, silicic acid and potash, consisting in finely triturating the raw material, intimately mixing the same with quick-lime, adding a substance having a fertilizing value to the material, moistening the mixture and subjecting it to the action of steam, and drying the mixture.

2. The process of preparing mineral fertilizer from materials containing alumina, silicic acid and potash, consisting in finely triturating the raw material in a dry state, intimately mixing the same with quick lime, adding a substance having a fertilizing value to the material, moistening the mixture and subjecting it to the action of steam, drying the mixture, and then converting the product into a finely divided state.

3. The process of manufacturing artificial manure from material containing alumina, silicic acid and potash, consisting in kiln drying the raw material, then finely triturating the dried raw material, intimately mixing the triturated material with quick lime, adding a substance having a fertilizing value to the material, moistening the mixture thus obtained and subjecting it to the action of steam, drying the mixture, and finally converting the product into a finely divided state.

4. The process of manufacturing artificial manure from materials containing alumina, silicic acid and potash, which consists in finely triturating the raw material in a dry state, separating the finer constituents of the refuse from the coarser, intimately mixing the separated finer constituents with quick lime, adding a substance having a fertilizing value to the material, moistening the mixture thus obtained and subjecting it to the action of steam, drying the mixture thus treated, and converting the product into a finely divided state.

5. The process of manufacturing artificial manure from materials containing alumina, silicic acid and potash, consisting in finely triturating the raw material, intimately mixing the same with quick lime, adding a substance having a fertilizing value to the material, intimately combining quick lime with the raw material and added substance, moistening the mixture thus obtained and subjecting it to the action of steam, drying the mixture thus treated, and inoculating the product with bacteria.

In testimony whereof I have hereunto set my hand in presence of two subscribing witnesses.

EDUARD POHL.

Witnesses:
 LOUIS VANDORN,
 M. KNEPPERS.